United States Patent
Galbreath et al.

(10) Patent No.: US 7,934,774 B2
(45) Date of Patent: May 3, 2011

(54) VEHICLE SEAT ASSEMBLY HAVING A HARDNESS GRADIENT

(75) Inventors: Ashford A. Galbreath, Troy, MI (US); Asad S. Ali, Troy, MI (US)

(73) Assignee: Lear Corporation, Southfield, MI (US)

( * ) Notice: Subject to any disclaimer, the term of this patent is extended or adjusted under 35 U.S.C. 154(b) by 629 days.

(21) Appl. No.: 11/278,160

(22) Filed: Mar. 31, 2006

(65) Prior Publication Data

US 2007/0236072 A1   Oct. 11, 2007

(51) Int. Cl.
*A47C 7/18* (2006.01)
(52) U.S. Cl. .............. 297/452.27; 297/452.26
(58) Field of Classification Search ........... 297/284.6, 297/452.26, 452.35, 452.37, 452.57, 452.27
See application file for complete search history.

(56) References Cited

U.S. PATENT DOCUMENTS

| | | | |
|---|---|---|---|
| 3,331,089 A | 7/1967 | Omas, Jr. et al. | |
| 3,869,831 A | 3/1975 | Gibb | |
| 4,696,516 A * | 9/1987 | Yeum | 297/452.37 |
| 4,755,411 A * | 7/1988 | Wing et al. | 297/452.27 |
| 5,000,515 A * | 3/1991 | Deview | 297/452.27 |
| 5,085,487 A * | 2/1992 | Weingartner et al. | 297/452.1 |
| 5,226,188 A | 7/1993 | Liou | |
| 5,294,181 A * | 3/1994 | Rose et al. | 297/452.25 |
| 5,343,876 A * | 9/1994 | Rogers | 5/653 |
| 5,442,823 A * | 8/1995 | Siekman et al. | 297/DIG. 1 |
| 5,492,662 A * | 2/1996 | Kargol et al. | 297/452.48 |
| 5,544,942 A * | 8/1996 | Vu Khac et al. | 297/452.37 |
| 5,564,144 A * | 10/1996 | Weingartner et al. | 297/452.27 |
| 5,816,661 A | 10/1998 | Sakurai et al. | |
| 5,872,714 A | 2/1999 | Shaikh et al. | |
| 6,063,461 A | 5/2000 | Hoyle et al. | |
| 6,082,824 A * | 7/2000 | Chow | 297/452.56 |
| 6,144,890 A | 11/2000 | Rothkop | |
| 6,293,625 B1 * | 9/2001 | Dixon | 297/452.25 |
| 6,546,578 B1 | 4/2003 | Steinmeier | |
| 6,588,086 B2 | 7/2003 | Trybus | |
| 6,701,556 B2 * | 3/2004 | Romano et al. | 297/452.27 |
| 6,899,399 B2 | 5/2005 | Ali et al. | |
| 6,941,188 B1 | 9/2005 | Arnold, II | |
| 7,334,278 B2 * | 2/2008 | Yamasaki | 297/452.27 |
| 2004/0262963 A1 | 12/2004 | Ali et al. | |
| 2007/0236072 A1 | 10/2007 | Galbreath et al. | |

FOREIGN PATENT DOCUMENTS

| | | |
|---|---|---|
| DE | 297 24 346 U1 | 12/2000 |
| DE | 100 38 830 A1 | 12/2001 |
| DE | 100 30 708 A1 | 1/2002 |
| DE | 202 02 042 U1 | 6/2002 |
| DE | 298 05 926 U1 | 4/2003 |
| EP | 0 021 191 A3 | 6/1980 |
| GB | 2 063 065 A | 6/1981 |
| JP | 09-76797 A | 3/1997 |
| JP | 10-117891 A | 5/1998 |
| JP | 2000-189272 A | 7/2000 |
| JP | 2002-112856 A | 4/2002 |
| WO | 2006/102751 A1 | 10/2006 |
| WO | 2007/053035 A1 | 5/2007 |

\* cited by examiner

*Primary Examiner* — Peter R. Brown
(74) *Attorney, Agent, or Firm* — Brooks Kushman P.C.

(57) ABSTRACT

In at least one embodiment, the present invention provides a vehicle seat assembly comprising a cushion having an "A" surface and a "B" surface, a central portion, and two bolster areas, with each bolster area being adjacent the central portion, with the cushion having a hardness gradient between at least one of the bolster areas and the central portion of between 8% to 25%.

20 Claims, 4 Drawing Sheets

VEHICLE SEAT ASSEMBLY HAVING A HARDNESS GRADIENT

BACKGROUND OF THE INVENTION

1. Field of the Invention

The present invention relates to a vehicle seat assembly having a hardness gradient and method of making the same. More specifically, the present invention relates to a vehicle seat assembly having areas that are configured to be less hard than other areas of the seat assembly and methods of making the same.

2. Background Art

Generally speaking, a vehicle seat assembly includes three fundamental components: (a) a frame to support the seat assembly and to mount it to a vehicle; (b) a foam cushion to cover the frame; and (c) trim material to cover the foam cushion and provide a durable surface for contact with a vehicle occupant. Typically, the foam cushion is made from an expandable foam material, such as polyurethane, and is molded to a predetermined shape during a molded process. For example, the predetermined shape of a typical bucket-style seat includes raised front, side, and rear bolster areas and recessed central seating and back sections. The trim material may include any number of materials, such as cloth, polymers, or leather. Often, the selection of trim material is governed by the sale price of the vehicle. For example, leather trim material may be used for luxury vehicles while cloth and polymeric materials may be used for less expensive vehicles.

An important consideration in the manufacture of seat cushions is to provide inboard and outboard portions of the seat cushion which are relatively resistant to premature wear while providing an insert or center portion which is soft and comfortable. Inboard and outboard sides of the vehicle seat assembly typically bear most of the load when the occupant gets in and out of the vehicle and therefore require additional rigidity relative to the center insert portion of the vehicle seat assembly. Presently, there is no relatively inexpensive and simple way of providing a vehicle seat assembly having more rigid inboard and/or outboard bolster areas relative to the center insert area.

Accordingly, there is a need to provide a vehicle seat assembly which has a seat cushion that has a relatively rigid outboard and inboard bolster area and a relatively less rigid center portion area which can be manufactured easily and relatively economically.

Moreover, in certain vehicles, occupant sensing systems are provided to help detect whether or not a given seat is occupied and/or the location of and/or the size of the occupant in a given seat. These occupant sensing systems typically include sensors which can be located underneath the foam cushion.

These sensors are typically made of rigid material which can bother the occupant and/or become damaged under the weight of the vehicle cushion. Weight loading from the occupant can press the soft cushion into the relatively rigid sensors. Over time, the cushion and possibly the trim of the vehicle seat assembly can prematurely wear due to repeated loading from the relatively rigid sensors. Once the foam of the seat cushion begins to wear, the occupant is more likely to feel the sensors through the cushion, and this can make sitting on the vehicle seat assembly somewhat uncomfortable.

Accordingly, there is a need to provide a vehicle seat assembly which can accommodate occupant sensing systems without substantial impact on seat comfort to the occupant or damage to the sensor.

SUMMARY OF THE INVENTION

According to at least one aspect of the present invention, a vehicle seat assembly is provided. In at least one embodiment, the vehicle seat assembly comprises a cushion having an "A" surface and a "B" surface, a central portion, and two bolster areas, with each bolster area being adjacent the central portion, and the cushion having a hardness gradient between at least one of the bolster areas and the central portion of between 8% to 25%.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Moreover, except where otherwise expressly indicated, all numerical quantities in this description and in the claims are to be understood as modified by the word "about" in describing the broader scope of this invention. Practice within the numerical limits stated is generally preferred. Also, unless expressly stated to the contrary, the description of a group or class of materials by suitable or preferred for a given purpose in connection with the invention implies that mixtures of any two or more members of the group or class may be equally suitable or preferred.

Figure 1:
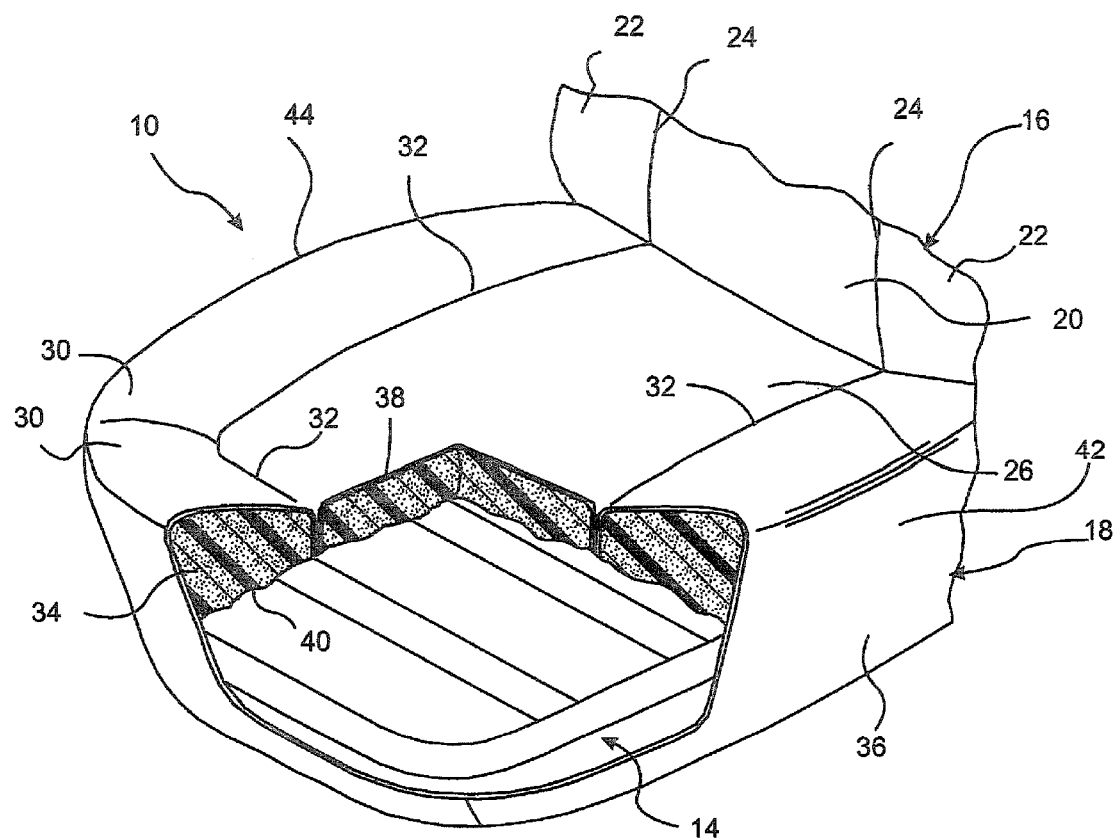
FIG. 1 is a cut-away environmental view of a vehicle seat assembly in accordance with an environment of the present invention.

Referring now to the figures, where like numerals are used to designate like structure throughout to the drawings, a schematic vehicle seat assembly in accordance with at least one embodiment of the present invention is generally shown at 10 in FIG. 1. While the vehicle seat assembly 10 is illustrated in FIG. 1 to be a bucket seat assembly, it should be understood that the principles of the present invention are applicable to other types of seat assemblies, such as bench, captain, and other types of seat assemblies. It should also be understood that the principles of the present invention are applicable to other applications where foam is a component such as back rests, back support pads, arm rests, and head restraints.

As shown in FIG. 1, the vehicle seat assembly 10 includes a seat frame, generally indicated at 14 having a plurality of mounting brackets (not shown) adapted to operatively secure the seat frame within a vehicle. The seat frame 14 may be constructed from any material suitable for application within a vehicle seat assembly 10, such as aluminum, steel or other metal alloy or a suitable polymer. Further, the seat frame 14 may be manufactured using a technique commonly known in the art, relative to the type of material employed. By way of example, manufacturing techniques may include stamping, welding, fastening or molding a suitable material to form a seat frame 14.

The vehicle seat assembly 10 also includes a seat back, generally indicated at 16, and a lower seat assembly, generally indicated at 18. In at least the illustrated embodiment, the seat back 16 includes a central back support pad 20, side bolsters 22, and trenches 24 between the bolsters 22 and the pad 20. In at least the illustrated embodiment, the lower seat assembly 18 includes a central seating pad 26, a plurality of bolsters 30 substantially surrounding at least two opposing sides, and as shown here, three sides, and trenches 32 between the bolsters 30 and the pad 26, and other components having foam cushion parts, such as arm rests and head restraints.

The vehicle seat assembly 12 further includes a back foam cushion (not shown) and a seat foam cushion generally indicated at 34. The seat foam cushion 34 is conventionally secured to the seat frame 14 and/or a seat assembly infrastructure (not shown). The foam cushion 34 may be secured to the seat frame 14 and/or infrastructure by any method generally known in the art, such as by an adhesive. It should be understood while the foam cushion 34 is illustrated to be a bucket-seat bottom cushion, the present invention can be applicable to any type of seat cushion such as a seat back cushion for a bucket-seat and seat back and bottom cushion for bench seats, as well as other types of seats.

The vehicle seat assembly 12 also includes a trim material 36 adapted to engage the foam cushion 34 (or cushions) in a covering relationship. The trim material 36 may include any material commonly known in the art. By way of example, some of the known materials include cloth, leather, or polymers of sufficient quality and thickness for use in seat trim applications. Polymer trim materials may include a flexible closed cell polymer skin material such as polyvinyl, polyvinyl chloride (PVC), thermoplastic olefin (TPO), or thermoplastic urethane (TPU). Additionally, materials for use as trim material 36 may include a foam backing (not shown, but generally known in the art) which may be manufactured from a variety of polymer foam materials. By way of example, the foam backing may be polyethylene, polypropylene, polyurethane, or a polystyrene foam. Optionally, a mesh or reinforcing material (not shown, but generally known in the art) such as fiberglass or nylon may be applied to the foam backing or back of the trim material 34 for increasing strength without increasing rigidity.

The seat cushion 34 has an upper surface 38 and a lower surface 40 that is spaced from the upper surface 38. The upper surface 38 of the seat cushion 34 may be referred to as the "A" surface, and the lower surface 40 may be referred to as the "B" surface. The seat cushion 34 also defines an inboard side 42 and an outboard side 44. When an occupant (not shown) is supported on the lower seat assembly 18, the weight of the occupant will generally apply an axial load directed generally through the upper surface 38 of the seat cushion 34 towards the lower surface 40. Although the weight of the occupant will generally induce an axial as well as sheer force in the seat cushion 34, those having ordinary skill in the art will recognize that the primary load path of the occupant's weight will be substantially vertical from the upper surface 38 towards the lower surface 40 through the seat cushion. However, when the occupant is getting in and out of the vehicle, an increased and substantially sizeable load will typically be placed on the inboard and outboard bolster portions 30 of the seat cushion 34.

In accordance with the present invention, a seat cushion 34 is provided that has bolster portions 30 having a greater hardness relative to the central seating pad 26. To provide the desired hardness gradient, seat cushion 34 can be provided with intrusion and/or protrusion in the bolster areas and/or the center area to provide a seat cushion 34 having varying hardness areas. For instance, the seat cushion 34 can be manufactured so that one or more of the bolsters 30 is harder than the central seating pad 26. Prior to the present invention, the most commonly used techniques of imparting hardness gradients in seating foam systems was limited to the use of different foam formulations or mix ratios within the tool divided by inserts and/or by layering using foam inserts of desired and various densities, additions of felts, cloths, etc. The present invention enables the modification of the hardness of the foam primarily in the central seating pad 26, i.e., areas of typical consumer contact while driving, while keeping the other areas of the seat cushion 34, i.e., the bolsters 30, firmer to enable improved craftmanship and durability performance. Such a configuration enables the central seating pad 26 to be softer for improved occupant comfort while allowing the bolster(s) 30 to be harder to account for the typically higher loads placed upon the bolster(s) 30 upon occupant ingress and egress.

While the harness gradient can generally be achieved by providing intrusion such as holes and/or other geometric opening, and/or protrusion on the "B" surface 40 of the seat cushion 34, it is contemplated that these location, size, shape of the intrusions and/or protrusions can vary as desired. However, in at least one embodiment, the seat cushion 34 of the present invention has a hardness gradient between at least one of the bolsters 30 and the central seating pad 26 area of the seat cushion 34 are between 8% to 25%. In other words, at least one bolster area has a hardness that is at least 8% to 25% greater than the hardness of the central seating pad 26. The hardness can be measured by indention forced deflection (IFD) as measured by ASTM test method No. D3574. In other embodiment, the seat cushion 34 of the present invention has a hardness gradient between at least one of the bolsters 30 and the central seating pad 26 of the seat cushion 34 of between 10% and 20%, and in other embodiments of 12% and 18%.

In at least one embodiment, the hardness of the central seating pad 26 of the seat cushion 34, as measured by ASTM test method No. D3574, is between 100 and 240 newtons, and in other embodiments between 150 and 225 newtons. In at least another embodiment, the hardness of at least one of the bolsters 30, as measured by ASTM test method D3574, is between 230 and 350 newtons, and in other embodiments between 250 to 300 newtons.

Furthermore, in at least one embodiment, the seat cushion 34 of the present invention has a hysterisis loss gradient between at least one of the bolsters 30 and the central seating pad 26 area of the seat cushion 34 are between 8% to 25%. In other words, at least one bolster area has a hysterisis loss that is at least 8% to 25% less than the hysterisis loss of the central seating pad 26. The hysterisis loss can be measured by indention forced deflection (IFD) as measured by ASTM test method No. D3574. In other embodiment, the seat cushion 34 of the present invention has a hysterisis loss gradient between at least one of the bolsters 30 and the central seating pad 26 of the seat cushion 34 of between 10% and 20%, and in other embodiments of 12% and 18%.

Figure 2:
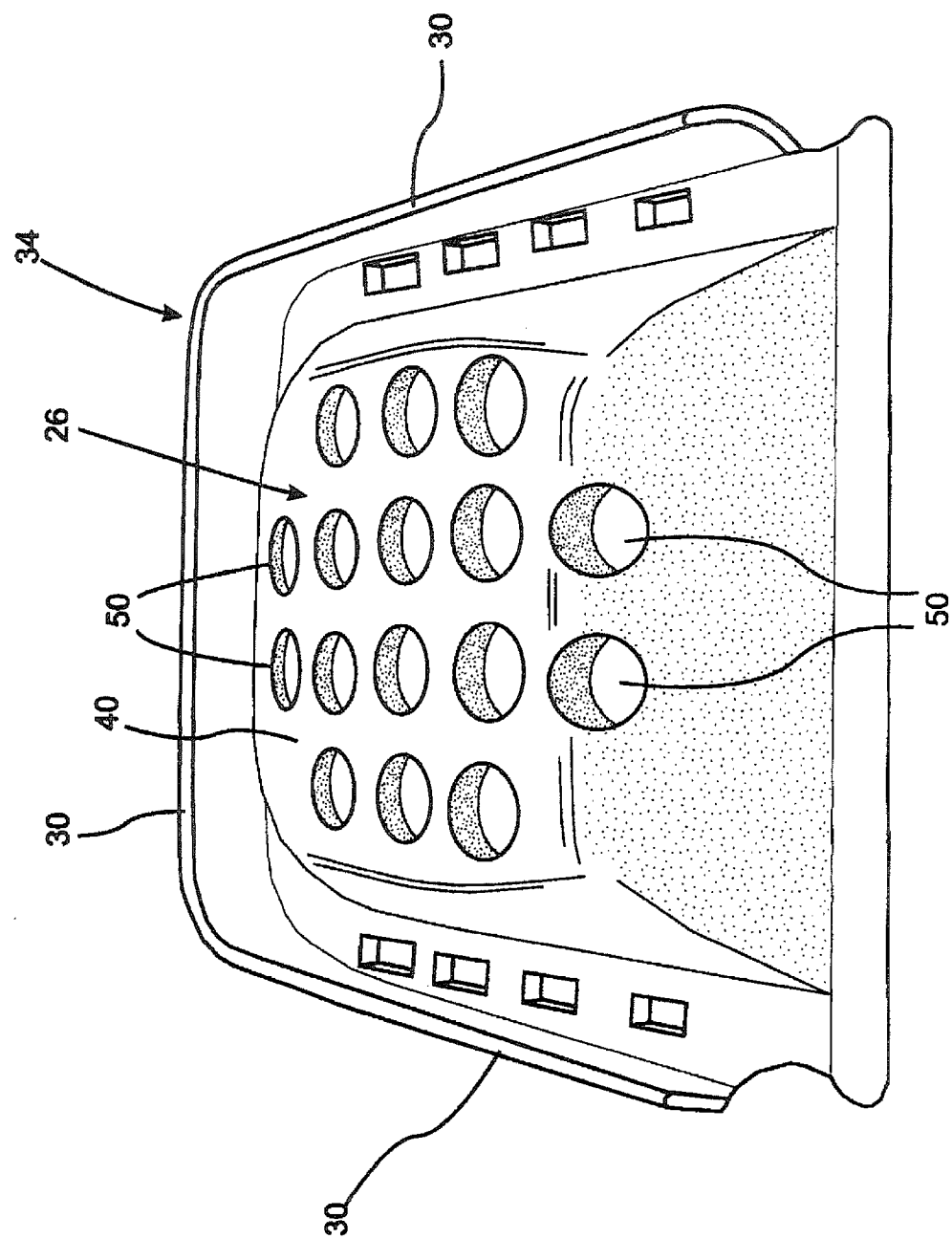
FIG. 2 is a bottom perspective view of a bottom seat cushion useable with the vehicle seat assembly illustrated in FIG. 1.

Referring to FIG. 2, the "B" surface 40 of an embodiment of a seat cushion 34 is shown. In this embodiment, the central seating pad 26 has a number of openings or holes 50 that extend from the "B" surface 40 towards the "A" surface 36. While in most embodiments, the openings 50 extend to the "A" surface 36, in some embodiments the openings can extend to and through the "A" surface 36.

While the openings 50 are shown to be circular, it should be understood that the openings 50 can vary in size and shape as desired. For instance, while the openings 50 are shown to be cylindrical holes, it should be understood that they could be channels and/or slots, and/or frustoconical, conical, polygonyl or other geometric cutouts.

In at least the embodiment illustrated in FIG. 2, there are 16 openings in the "B" surface 40. However, it should be understood the number of openings 50 can vary as desired. As can be seen in FIG. 2, the bolsters 30 have small channels 52. The channels 52 are smaller in size and number than the openings 50 and as such, the bolsters 30 have a greater hardness than the central seating pad 26. While it should be understood that the size and shape of the openings 50 can vary as desired, in at least one embodiment, the openings 50 have a diameter of 0.2 to 5 cm., in other embodiments of 0.5 to 3.25 cm., and in yet other embodiments of 1 to 2.5 cm. Furthermore, in at least one embodiment, the openings 50 have and a depth or length of 0.1 to 5 cm., in other embodiments of 0.25 to 2.5 cm., and in yet other embodiments of 0.5 to 2 cm.

Figure 3:
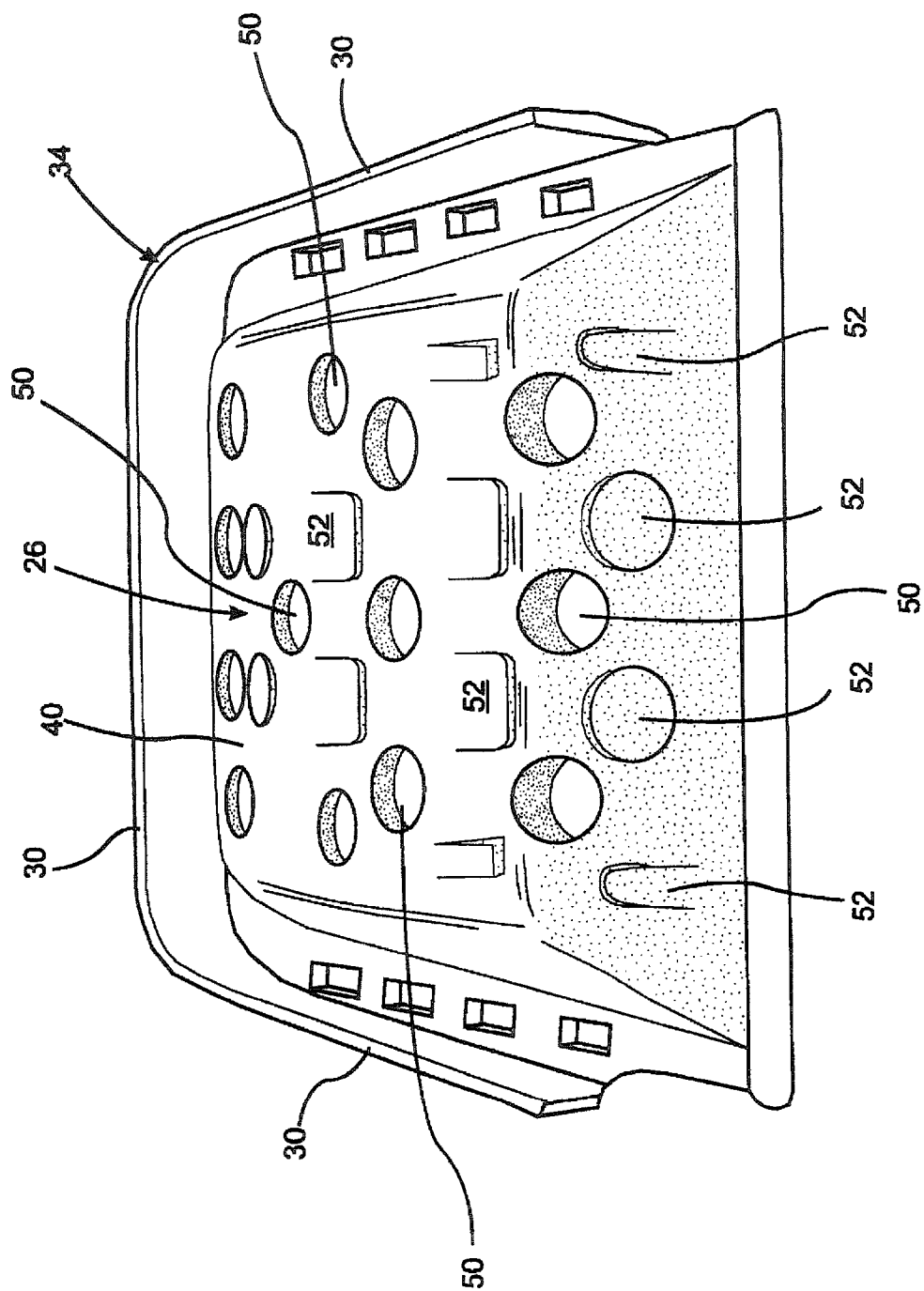
FIG. 3 is a view similar to FIG. 2 showing another embodiment of the present invention.

FIG. 3 illustrates another embodiment of the seat cushion 34. In this embodiment, protrusions 52 can be provided on the "B" surface of the seat pad 26. The protrusions 52 extend away from the "A" surface 38. Like the openings 50, the protrusions 52 can vary in size, shape and number as desired. In at least one embodiment, the protrusions 52 have a length of 0.2 to 5 cm., in other embodiments of 0.5 to 3.25 cm., and in yet another embodiment of 1 to 2.5 cm. In at least one embodiment, the protrusions 52 have a width of 0.5 to 5 cm., in other embodiments of 0.5 to 3.25 cm., and in yet another embodiment of 1 to 2.5 cm. In at least one embodiment, the protrusions 52 have a height of 0.1 to 5 cm, in other embodiments of 0.25 to 2.5 cm., and in yet other embodiments of 0.5 to 2 cm. It should be understood that the size, shape, and/or geometry of the openings 50 and/or protrusions 52 can vary from each other. For instance, one opening can be different in size, shape, and/or geometry from another opening 50 and/or protrusion 52.

Moreover, while the openings 50 can be provided to provide a density and/or hardness gradient to tailor the specific comfort requirements of the seat assembly, the holes 50 could also be used to reduce weight of the overall seat assembly, and in particular the foam cushion. For instance, the foam could be cored to have intrusions such as holes and/or channels in areas of large seating surfaces such as armrests and/or center portions between seat occupants. Moreover, while the seat assembly has been described as having bolster portion(s) that are harder than the remainder of the seat assembly, it should be understood that the principles of the present invention can be used to manufacture seat assemblies having areas of the seat assemblies that are harder, or at least as hard, as one or more of the bolsters.

The seat cushion 34 of the present invention can be made by a variety of methods. In at least one embodiment, the seat cushion 34 is made by molding wherein the intrusions and/or protrusions are molded into the bottom surface 40 of the seat cushion 34 during the molding operation. In this embodiment, the foam molding tool can be provided with protrusions and/or cavities around and/or within which the foam can be molded.

Figure 4:
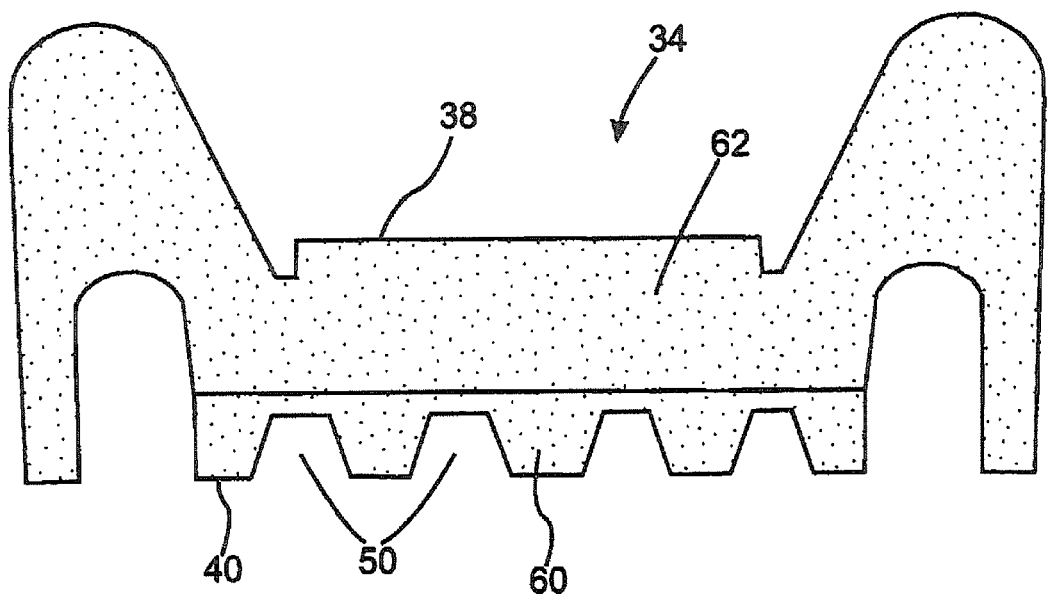
FIG. 4 is a side view illustrating another embodiment of a bottom seat cushion useable with the seat assembly of the present invention.
Figure 5:
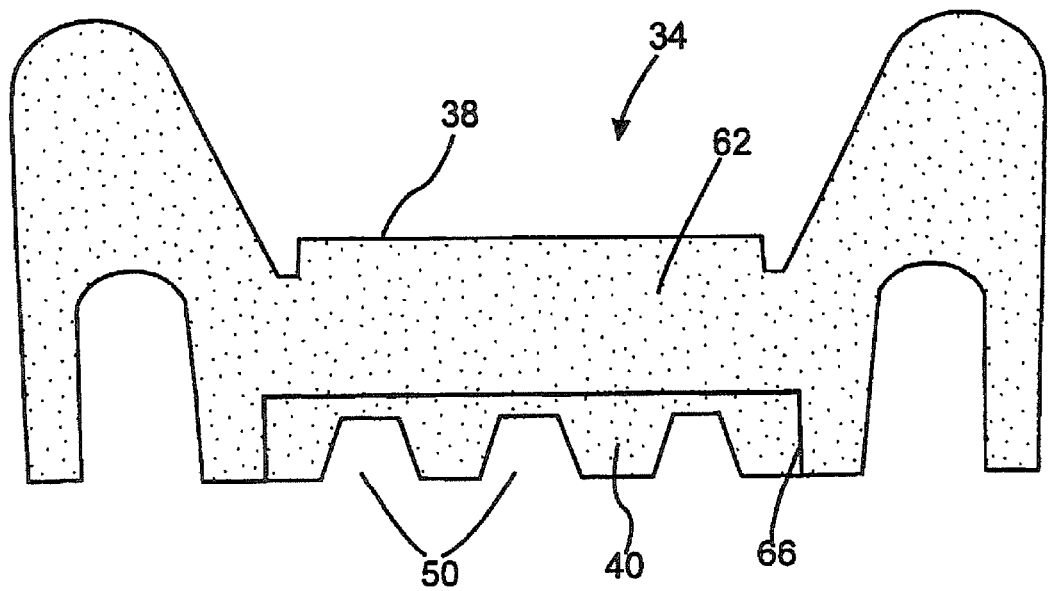
FIG. 5 is a view similar to FIG. 4 showing another embodiment of the present invention.

Referring to FIG. 4, in at least another embodiment, intrusions and/or protrusions are molded into a foam sub-assembly 60 which is then secured to the substantially planar bottom surface of a seat bottom 62 not having protrusions and/or opening (at least a substantial amount which would cause the necessary density gradient). The seat bottom 62 has the "A" surface 38 and the subassembly 60 has the "B" surface 40. Referring to FIG. 5, the seat bottom 62 has a cavity 66 within which sub-assembly 60 is received. In these embodiments, the subassembly 60 can be secured to the seat bottom 62 by any suitable method such as adhesion and/or fasteners.

While embodiments of the invention have been illustrated and described, it is not intended that these embodiments illustrate and describe all possible forms of the invention. Moreover, the words used in the specification are words of description rather than limitation, and it is understood that various changes may be made without departing from spirit and scope of the invention.

What is claimed is:

1. A vehicle seat assembly comprising:
a cushion having a top surface, a bottom surface, spaced from the top surface, a left side outer surface and a right side outer surface, with each outer surface extending between and connecting the top and bottom surfaces, the cushion further having a central portion extending between the top and bottom surfaces, and two bolster areas extending between the top and bottom surfaces, with each bolster area being laterally spaced from each other and laterally adjacent to opposed sides of the central portion such that the central portion extends laterally between the two bolster areas and the bolster areas each including a respective one of the outer surfaces, the central portion having at least one recess therein, the cushion having a hardness gradient between at least one of the bolster areas and the central portion of between 8% to 25% and the cushion having a hysteresis loss gradient between at least one of the bolster areas and the central portion of at least 8%, and wherein the at least one bolster areas has a hardness that is at least 8% to 25% greater than the hardness of the central portion and wherein hardness is a resistance measurement and hysteresis loss is a recovery measurement.

2. The vehicle seat assembly of claim 1 wherein the central portion has holes formed in the bottom surface of the central portion to provide a reduced hardness relative to the at least one of the bolster areas.

3. The vehicle seat assembly of claim 2 wherein the holes have a diameter of 0.2 to 5.0 cm. and a length of 0.1 to 5.0 cm.

4. The vehicle seat assembly of claim 3 wherein the cushion comprises a molded foam cushion and the holes are formed during the molding of the cushion and the hysteresis loss gradient between at least one of the bolsters and the central portion is 12% to 18%.

5. The vehicle seat assembly of claim 3 wherein the holes are formed on a sub cushion assembly that is attached to a main cushion assembly.

6. The vehicle seat assembly of claim 3, wherein the holes do not extend through the top surface of the cushion.

7. The vehicle seat assembly of claim 6, wherein the bolster areas do not have any pronounced holes formed therein.

8. The vehicle seat assembly of claim 2 wherein the bottom surface has protrusions formed therein that extend away from the top surface.

9. The vehicle seat assembly of claim 8 wherein the protrusions extend from the bottom surface, away from the top surface, a distance of 0.2 to 5.0 cm.

10. The vehicle seat assembly of claim 1, wherein each bolster area and the central portion have an uppermost surface portion, the uppermost surface portions of the bolster areas being elevated relative to the uppermost surface portion of the central portion.

11. The vehicle seat of claim 1, wherein the bolster areas comprise the outermost inboard and outboard sides of the vehicle seat.

12. The vehicle seat assembly of claim 1, wherein the central portion has holes formed in the bottom surface of the central portion to provide a reduced hardness relative to the at least one of the bolster areas, wherein the holes each have a diameter of 0.2 to 5.0 cm. and a length of 0.1 to 5.0 cm and wherein the bolster areas comprise the outermost inboard and outboard sides of the vehicle seat.

13. The vehicle seat assembly of claim 12, wherein the bolster areas do not have any pronounced holes formed therein.

14. The vehicle seat assembly of claim 1, wherein the central portion of the cushion extends from the rear of the cushion to the front of the cushion.

15. A vehicle seat assembly comprising:
a seat frame; and
a cushion supported on the seat frame, the cushion having a top surface facing away from the seat frame and a bottom surface spaced below the top surface and facing the seat frame, a central portion having at least one discontinuity on the bottom surface affecting the hardness of the cushion, and a first bolster area adjacent the central portion and forming an outer side surface of the cushion, wherein the cushion has a hardness gradient between the bolster area and the central portion of between 8% to 25% and the cushion having a hysteresis loss gradient between the bolster area and the central portion of at least 8%, wherein the hysteresis loss gradient is different from the hardness gradient, and wherein the bolster area has a hardness that is at least 8% to 25% greater than the hardness of the central portion and wherein hardness is a resistance measurement and hysteresis loss is a recovery measurement.

16. The vehicle seat assembly of claim 15 further comprising a second bolster area spaced laterally from the first bolster area, the first bolster area being disposed on a first side of the central portion of the cushion and the second bolster area being disposed on a second side, laterally spaced and opposite the first side, of the central portion of the cushion.

17. The vehicle seat assembly of claim 16, wherein each bolster area and the central portion have an uppermost surface portion, the uppermost surface portions of the bolster areas being elevated relative to the uppermost surface portion of the central portion, and wherein the hysteresis loss gradient between at least one of the bolsters and the central portion is between 10% to 20%.

18. The vehicle seat of claim 17, wherein the first bolster area comprises the outermost inboard side of the vehicle seat and the second bolster area comprises the outermost outboard side of the vehicle seat.

19. A vehicle seat assembly consisting of:
a cushion having a top surface and a bottom surface, a central portion having holes extending inwardly from the bottom surface, and two bolster areas, with each bolster area being laterally spaced from each other and laterally adjacent to opposed sides of the central portion, the cushion having a hardness gradient between at least one of the bolster areas and the central portion of between 8% to 25% and the cushion having a hysteresis loss gradient between at least one of the bolster areas and the central portion is at least 8%, wherein the holes do not extend through the top surface of the cushion;
a trim cover disposed over the cushion; and
wherein the at least one bolster areas has a hardness that is at least 8% to 25% greater than the hardness of the central portion and wherein hardness is a resistance measurement and hysteresis loss is a recovery measurement.

20. The vehicle seat assembly of claim 19 wherein the holes have a diameter of 0.2 to 5.0 cm and a length of 0.1 to 5.0 cm.

* * * * *